United States Patent [19]

Yokoi et al.

[11] Patent Number: 4,806,437

[45] Date of Patent: Feb. 21, 1989

[54] VIBRATION ISOLATING MOUNT

[75] Inventors: Hiroshi Yokoi; Yoshihiro Ogawa, both of Nagoya; Hideyuki Imai, Minokamo, all of Japan

[73] Assignee: Toyoda Gosei Co., Ltd., Nishikasugai, Japan

[21] Appl. No.: 183,702

[22] Filed: Apr. 19, 1988

[30] Foreign Application Priority Data

Aug. 28, 1987 [JP] Japan .................. 62-215878

[51] Int. Cl.[4] ............................... F16F 7/00
[52] U.S. Cl. .......................... 428/623; 428/625; 428/653; 428/681; 267/140.1; 267/141; 267/153; 267/292
[58] Field of Search ............ 267/140.1, 141, 153, 267/292; 428/591, 623, 624, 625, 653, 681

[56] References Cited

U.S. PATENT DOCUMENTS

| | | | |
|---|---|---|---|
| 1,735,899 | 11/1929 | Henry | 267/141 |
| 3,007,692 | 11/1961 | Kniffin, Jr. | 267/141 |
| 3,160,549 | 12/1964 | Caldwell et al. | 267/141 |
| 4,739,962 | 4/1988 | Morita et al. | 267/140.1 |

*Primary Examiner*—L. Dewayne Rutledge
*Assistant Examiner*—George Wyszomierski
*Attorney, Agent, or Firm*—Cushman, Darby & Cushman

[57] ABSTRACT

A vibration isolating mount has a columnar vibration isolating rubber body, an upper retaining plate bonded to an upper end surface of the columnar rubber body, a lower retaining plate bonded to a lower end surface of the columnar rubber body, an upper bracket plate made of nonferrous metal and secured to an upper surface of the upper retaining plate, and a lower bracket plate made of nonferrous metal and secured to a lower surface of the lower retaining plate, and two chemical conversion coating layers formed in a lower surface of the upper retaining plate and an upper surface of the lower retaining plate. Each chemical conversion coating layer is made of one of zinc phosphate and calcium zinc phosphate, and improves the adhesive strength between each retaining plate and the rubber body while preventing each retaining plate from peeling off from the rubber body.

6 Claims, 2 Drawing Sheets

VIBRATION ISOLATING MOUNT

BACKGROUND OF THE INVENTION

1. Field of the Invention

The present invention relates to a vibration isolating mount, and more particularly to a vibration isolating mount having excellent vibration isolating performance and exhibiting excellent durability in corrosive environment.

2. Description of the Prior Art

Vibration housing mounts have been employed as an engine mount, a body mount or the like of a vehicle, and are generally composed of a vibration isolating rubber body, retaining members made of iron, which are bonded to opposed surfaces of the vibration isolating rubber body, respectively, and a bracket for connecting the retaining members to a vibrating body.

By forming the above described bracket of light weight nonferrous metal such as aluminum alloy, the vibration absorbing characteristic of the vibration isolating mount can be improved. However, this vibration isolating mount has a following problem.

Namely, in the presence of corrosive environment factors such as sea-water spray in littoral districts and salt for melting snow in cold districts, a local corrosion battery is produced between the bracket made of nonferrous metal and the adjacent retaining member made of iron. This results in the adhesive strength being lowered.

SUMMARY OF THE INVENTION

It is an object of the present invention to provide a vibration isolating mount having both excellent vibration absorbing performance and excellent durability in corrosive environment.

The vibration isolating mount of the present invention has a vibration isolating rubber body and two retaining members made of iron, and bonded to opposed surfaces of the vibration isolating rubber body, respectively. The retaining members are connected to a vibrating body by means of a bracket made of nonferrous metal. And a chemical conversion coating layer made of zinc phosphate or a zinc calcium phosphate, is formed between at least one retaining member and the vibration isolating rubber body.

In the presence of corrosive environment factors such as water and salt water, a local corrosion battery is formed on the surface of the bracket made of nonferrous metal.

By providing the zinc phosphate or zinc calcium phosphate chemical conversion coating layer between the retaining member and the vibration isolating rubber body, the adhesive strength can be improved and the retaining member can be effectively prevented from peeling off from the rubber body.

Furthermore, since the bracket is made of nonferrous metal, the vibration absorbing performance can be greatly improved.

BRIEF EXPLANATION OF THE DRAWINGS

FIG. 1 is a sectional veiw of the vibration isolating mount;

FIG. 2 is an enlarged view of one portion encircled by a circle A in FIG. 1.

DETAILED DESCRIPTION OF THE EMBODIMENTS

Hereinafter, the present invention will be explained in accordance with embodiments wherein the present invention is applied to an engine mount for a vehicle, with reference to the drawings.

Figure 1:
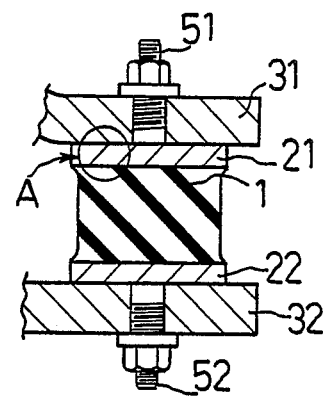
FIGS. 1 and 2 illustrate a first embodiment of a vibration isolating mount according to the present invention.

In FIG. 1, to both an upper surface and a lower surface of a columnar vibration isolating rubber body 1 are bonded retaining plates 21 and 22 with adhesive. Each of the retaining plates 21 and 22 is made of steel or cast iron and has a diameter nearly equal to that of the vibration isolating rubber body 1. Bolts 51 and 52 stand at centers of the retaining plates 21 and 22, respectively. One end of a long plate-shaped bracket 31 is in close contact with the upper surface of the retaining plate 21 while one end of another long plate-shaped bracket 32 is in close contact with the loser surface of the retaining plate 22. The bolts 51 and 52 are inserted into through holes formed in the brackets 31 and 32 and fixed by nuts, respectively.

The brackets 31 and 32 are casts of aluminum alloy. The other ends (not shown) of the brackets 31 and 32 are connected to a vehicle engine and a vehicle frame, respectively.

Figure 2:
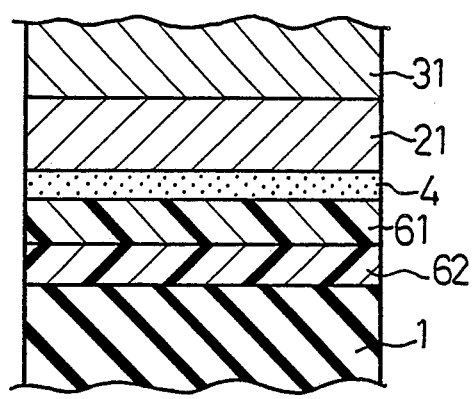

FIG. 2 illustrates the detailed structure of the bonded portion of the retaining plate 21 and the vibration isolating rubber body 1.

In FIG. 2, a chemical conversion coating layer 4 made of zinc phosphate, is formed on the lower surface of the retaining plate 21 with which the bracket 31 is in close contact. And a undercoat adhesive layer 61 intimate with metal is formed on the lower surface of the chemical conversion coating layer 4 and an overcoat adhesive layer 62 intimate with rubber is formed on the lower surface of the undercoat adhesive layer 61. The retaining plate 21 is bonded to the vibration isolating rubber body 1 by virtue of the adhesive layers 61 and 62.

The above described chemical conversion coating layer 4 may be composed of another chemical conversion coating layer made of calcium zinc phosphate.

The bonding step of the retaining plate 21 and the vibration isolating rubber body 1 is performed in such a method as follows, for example. At first, the retaining plate 21 is immersed in a solution containing zinc primary phosphate and free phosphoric acid as main ingredients at a solution temperature of 45° through 95° C. for 3 through 30 minutes to form the chemical conversion coating layer 4 of zinc phosphate on the surface of the retaining plate 21.

In this step, another solution containing zinc primary phosphate, free phosphoric acid and calcium primary phosphate as main ingredients may be used under similar conditions to the above described solution. In this case, the chemical conversion coating layer of calcium zinc phosphate is formed.

Next, the retaining plate 21 is coated with an undercoat adhesive 61 and an overcoat adhesive 62, and then, is cured with a natural rubber material to obtain the above described vibration isolating rubber body 1 to which the retaining plate 21 is bonded.

Phenol resin adhesive is preferably used as the undercoat adhesive 61. Or a mixture of the phenol resin adhesive with another adhesive such as chlorinated rubber, chlorinated polypropylene, chlorinated etylene-polyproplene copolymer, chloroprene-rubber, vinyl chloride elastomer and the like will do. In this case, the adhesive strength is further improved.

Well known adhesive for rubber, such as adhesive containing halogenated elastomer as a main ingredient can be preferably used as the overcoat adhesive 62.

The vibration isolating rubber body 1 is made of natural rubber (NR) or various synthetic rubber such as chlorinated isobutylene-isoprene rubber, chloroprene rubber (CR), chlorosulfonated polyethylene (CSM), styrene-butadiene rubber (SBR), acrylonitrile-butadiene rubber (NBR), etylene-propylene-diene terpolymer rubber (EPDM), etylene-propylene copolymer rubber (EPM) and the like.

The retaining plate 22 is also bonded to the vibration isolating rubber body 1 similarly to the case of the retaining plate 21.

Furthermore, the retaining plates 21 and 22 may be bonded to the vibration isolating rubber body 1 by another method. Namely, the chemical conversion coating film 4 is formed on each of the retaining plates 21 and 22 and then is coated with the undercoat adhesive 61 and the overcoat adhesive 62. Next, the previously cured vibration isolating rubber body 1 is disposed between the obtained retaining plates 21 and 22. and is subjected to the heating and pressing steps.

Test pieces, each having the above described structure, are prepared by the following method, and the adhesive property thereof in corrosive environment is evaluated.

Namely, oil or the like attached to the opposed surface of the retaining plates 21 and 22 is first removed with trichloroethane, and the opposed surfaces thereof are subjected to the grit blasting treatment to form rough surfaces, each having minute concaves and convexes.

The obtained retaining plates 21 and 22 are immersed in a solution of a pH value of about 2 to 3, which contains zinc primary phosphate and free phosphoric acid as main ingredients, and nitrite such as sodium nitrite, or chlorate as an accelerator at a solution temperature of 50 to 60° C. for 3 to 10 minutes, and washed to form a chemical conversion coating layer 4 of zinc phosphate on the surface of each of the retaining plates 21 and 22. The average weight of the obtained coating layer 4 of zinc phosphate is 0.5 through 6 g/m$^2$, and preferably 1 through 3 g/m$^2$.

The lower surface of the retaining plate 21 and the upper surface of the retaining plate 22, on each of which the chemical conversion coating layer 4 of zinc phosphate is formed, are coated with Lord Corporation's Chemlok 205 (14 to 20 weight % of phenol resin and 50 weight % of chlorinated polymer) as phenol resin adhesive by spraying, and dried at 50° C. for 10 minutes to form the adhesive layers 61.

Then, the adhesive layers 61 are coated with Lord Corporation's Chemlok 202 as adhesive for rubber by spraying and dried at 50° C. for 10 minutes to form the adhesive layer 62. The thickness of each of the adhesive layers 61 and 62 is 10 μm. The above described coating steps may be performed by using brushes, rollers or the like.

Next, an uncured natural rubber material having the composition shown in the following Table 1 is disposed between the retaining plates 21 and 22, heated and pressed at 150° C. for 30 minutes by pressing device to be cured and bonded.

TABLE 1

| Compounding Ingredient | Composition Ratio (weight ratio) |
|---|---|
| Natural Rubber(NR) | 100 |
| HAF carbon black | 60 |
| Naphthene process oil | 15 |
| Zinc oxide | 5 |
| Paraffin wax[1] | 1 |
| Age resistor-1[2] | 1 |
| Age resistor-2[3] | 0.5 |
| Vulcanization accelerator[4] | 1 |
| Sulfur | 1.5 |

[1] Ouchi Shinko Chemical Industrial Co., Ltd.'s SUNNOC N
[2] Ouchi Shinko Chemical Industrial Co., Ltd.'s NOCRAC 224[poly(2,2,4-trimethyl-1,2-dihydroquinoline)]
[3] Ouchi Shinko Chemical Industrial Co., Ltd.'s NOCRAC 810-NA(N—phenyl-N'—isopropyl-p-phenylenediamine)
[4] Ouchi Shinko Chemical Industrial Co., Ltd.'s NOCCELER CZ(N—cychlohexyl-2-benzothiazolylsulfenamide)

Bolts 51 and 52 are provided on the upper surface of the retaining plate 21 and the lower surface of the retaining plate 22 so as to project therefrom, respectively. The bolts 51 and 52 are inserted into holes of the brackets 31 and 32 made of aluminum alloy thereby to fix the retaining plates 21 and 22 and the brackets 31 and 32 in close contact with each other, respectively.

The obtained test pieces are evaluated on the adhesive property in corrosive environment by salt water spray test. The evaluation results are shown in Table 2 (Example 1).

Similarly, the salt water spray test is conducted on the test piece having a chemical conversion coating layer of calcium zinc phosphate (Example 2), the test piece having steel brackets and no chemical conversion coating layer (Comparison 1) and the test piece having aluminum alloy brackets and no chemical conversion coating layer (Comparison 2), respectively.

The chemical conversion coating layer of calcium zinc phosphate of Example 2 is formed by immersing a tests piece in a solution containing zinc primary phosphate, free phosphoric acid and calcium primary phosphate as main ingredients, and nitrite such as sodium nitrite, or chlorate as an accelerator at a solution temperature of 65° to 75° C. for 3 to 10 minutes.

The evaluation results thereof are also shown in Table 2.

The salt spray test is conducted in accordance with JIS Z 2371 under the conditions of a bonding area of 1.1 cm, and an elongation of 10%.

TABLE 2

| | Chemical Conversion Coating | Bracket | Adhesive property (days until complete peeling) |
|---|---|---|---|
| Example 1 | Zinc phosphate Chemical conversion coating | Aluminum alloy | 200 |
| Example 2 | Calcium zinc Phosphate Chemical conversion coating | Aluminum alloy | 240 |
| Comparison 1 | No coating | Steel | 60 |
| Comparison 2 | No coating | Aluminum alloy | 45 |

These test results show that by using the aluminum alloy brackets, the peeling is promoted, but that by providing the chemical conversion coating layer, days required until the retaining member completely peels off from the vibration isolating rubber body, can be extended four to five times as long as the case provided with no chemical conversion coating layer, and accordingly, the peeling resistance is drastically improved.

Figure 3:
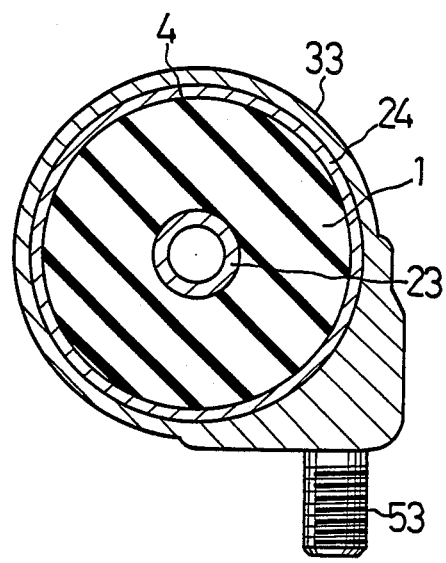
FIG. 3 is a sectional view of a second embodiment of the vibration isolating mount according to the present invention.

FIG. 3 illustrates a second embodiment of the vibration isolating mount of the present invention. In FIG. 3, the various isolating rubber body 1 is composed of a thick cylindrical body. Cylindrical retaining plates 23 and 24 (hereinafter will be called an inner cylinder 23 and an outer cylinder 24), each being made of steel or cast iron, are bonded to an inner peripheral surface and an outer peripheral surface of the cylindrical rubber body 1, respectively. The outer cylindrical 24 is fitted in a cylindrical portion of the bracket 33 made of aluminum alloy.

The chemical conversion coating layer 4 made of zinc phosphate or calcium zinc phosphate is formed on the entire inner peripheral surface of the outer cylinder 24. The outer cylinder 24 is bonded to the rubber body 1 through the chemical conversion coating layer 4 and the adhesive layers.

The bracket 33 is connected to a vehicle frame (not shown) by means of a bolt 53 provided in the bracket 33, and the inner cylinder 23 is connected to a vehicle engine (not shown) by means of a bolt (not shown) inserted in the inner cylinder 23.

Instead, the bracket 33 may be connected to a vehicle engine (not shown) by means of a bolt 53 provided in the bracket 33 while the inner cylinder 23 may be connected to a vehicle frame (not shown) by means of a bolt (not shown) inserted in the inner cylinder 23.

The vibration isolating mount of the second embodiment having the above described structure can prevent the outer cylinder 24 from peeling off from the vibration isolating rubber body 1 in corrosive environment by virtue of the chemical conversion coating layer 4.

What is claimed is:

1. A vibration isolating mount comprising:
   a vibration isolating rubber body;
   two retaining members for retaining said vibration isolating rubber body, each of said two retaining members being made of iron and bonded to each of two opposed surfaces of said rubber body;
   a bracket for connecting at least one of said retaining members to a vibrating body, said bracket being made of nonferrous metal; and
   a chemical conversion coating layer formed in a surface of one portion of said at least one of retaining members, which portion is bonded to said rubber body, said chemical conversion coating layer being made of one of zinc phosphate and calcium zinc phosphate.

2. A vibration isolating mount according to claim 1, wherein said vibration isolating rubber body is composed of a columnar rubber body, said two retaning members are composed of an upper retaining plate bonded to an upper end surface of said columnar rubber body, and a lower retaining plate bonded to a lower end surface of said columnar rubber body, an upper bracket plate made of nonferrous metal is secured to an upper surface of said upper retaining plate, and a lower bracket plate made of nonferrous metal is secured to a lower surface of said lower retaining plate, said chemical conversion coating layer is formed in each of a lower surface of said upper retaining plate and an upper surface of said lower retaining plate.

3. A vibration isolating mount according to claim 1, wherein said vibration isolating rubber body is composed of a thick cylindrical rubber body, said two retaining members are composed of an outer retaining cylinder bonded to an outer peripheral surface of said cylindrical rubber body, and an inner retaining cylinder bonded to an inner pheripheral surface of said cylindrical rubber body, said bracket has a cylindrical cavity in which said outer retaining cylinder is fitted together with said cylindrical rubber body and said inner retaining cylinder, said chemical conversion coating layer is formed in an inner peripheral surface of said outer retaining cylinder.

4. A vibration isolating mount according to claim 1 wherein said bracket is made of aluminum alloy.

5. A vibration isolating mount according to claim 1, further comprising two adhesive layers formed between said vibration isolating rubber body and said two retaining members; said two adhesive layers being composed of an adhesive layer intimate with said chemical conversion coating layer, which is formed on the side of said two retaining members, and another adhesive layer intimate with rubber, which is formed on the side of said vibration isolating rubber body.

6. A vibration isolating mount according to claim 1, wherein said vibration isolating rubber body is selected from the group consisting of natural rubber, chlorinated isobutylene-isoprene rubber, chloroprene rubber, chlorosulfonated polyethylene, styrene-butadiene rubber, acrylonitrile-butadiene rubber, etylene-propylene-diene terpolymer rubber, and etylene-propylene copolymer rubber.

* * * * *